United States Patent
Boggs et al.

(10) Patent No.: US 8,792,138 B2
(45) Date of Patent: Jul. 29, 2014

(54) SYSTEM AND METHODS FOR AUTOMATIC COLOR DEFICIENT VISION CORRECTION OF AN IMAGE

(75) Inventors: Aaron Jacob Boggs, Lexington, KY (US); Scott Timothy Cramer, Lexington, KY (US); Matthew Ryan Keniston, Lexington, KY (US); Rodney Evan Sproul, Lexington, KY (US); Daniel Lee Thomas, Lexington, KY (US); Lane Thomas Butler, Lexington, KY (US)

(73) Assignee: Lexmark International, Inc. KY (US)

( * ) Notice: Subject to any disclaimer, the term of this patent is extended or adjusted under 35 U.S.C. 154(b) by 109 days.

(21) Appl. No.: 13/368,581

(22) Filed: Feb. 8, 2012

(65) Prior Publication Data
US 2013/0201496 A1 Aug. 8, 2013

(51) Int. Cl.
*H04N 1/60* (2006.01)
(52) U.S. Cl.
USPC .......... 358/3.24; 358/518; 358/530; 358/538; 382/114; 382/167
(58) Field of Classification Search
USPC ........ 358/1.9, 2.1, 3.24, 1.13, 1.18, 500, 501, 358/504, 515–527, 530–538; 345/589–605; 382/162–167
See application file for complete search history.

(56) References Cited

U.S. PATENT DOCUMENTS

| | | | | |
|---|---|---|---|---|
| 6,362,830 B1* | 3/2002 | Walraven | ...... | 345/600 |
| 6,591,008 B1* | 7/2003 | Surve et al. | ...... | 382/162 |
| 6,985,524 B1* | 1/2006 | Borchers | ...... | 345/600 |
| 7,145,571 B2* | 12/2006 | Jones et al. | ...... | 345/589 |
| 7,264,356 B2* | 9/2007 | Jones et al. | ...... | 345/591 |
| 7,379,586 B2* | 5/2008 | Ohashi et al. | ...... | 382/162 |
| 7,394,468 B2* | 7/2008 | Hofman et al. | ...... | 345/589 |
| 7,558,422 B2* | 7/2009 | Koyama et al. | ...... | 382/162 |
| 7,605,930 B2* | 10/2009 | Suzuki et al. | ...... | 358/1.14 |
| 7,737,992 B2* | 6/2010 | Hong et al. | ...... | 345/603 |
| 8,154,778 B2* | 4/2012 | Patton et al. | ...... | 358/518 |
| 8,514,239 B2* | 8/2013 | Miyahara | ...... | 345/590 |
| 2006/0256127 A1* | 11/2006 | Cho et al. | ...... | 345/591 |
| 2007/0024877 A1* | 2/2007 | Osumi et al. | ...... | 358/1.9 |

FOREIGN PATENT DOCUMENTS

| | | | | | |
|---|---|---|---|---|---|
| JP | 2009071541 A | * | 4/2009 | ...... | H04N 1/60 |
| JP | 2011142403 A | * | 7/2011 | ...... | H04N 1/60 |

* cited by examiner

*Primary Examiner* — Scott A Rogers
(74) *Attorney, Agent, or Firm* — Christine K. Garcia (57) ABSTRACT

A method that includes receiving an image, automatically determining at least one region of interest in the image based on at least one color deficiency type from a plurality of color deficiency types, modifying the image by correcting the at least one region of interest and producing an output of the modified image.

18 Claims, 4 Drawing Sheets

SYSTEM AND METHODS FOR AUTOMATIC COLOR DEFICIENT VISION CORRECTION OF AN IMAGE

CROSS REFERENCE TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Technical Field

The present disclosure relates to imaging science, and, more particularly, to automatic color deficient vision correction solution.

2. Description of the Related Art

Colors that people perceive on a substrate correspond to the amount of each wavelength of light that is reflected off the substrate that are in close proximity to each other. For color deficient individuals, a complete or a partial absence of, or abnormalities in, one or more cone types in the eye(s) results in the difficulty or the inability to differentiate between colors in the visible color spectrum. People with color vision deficiencies may encounter data that are in colors that may be difficult for them to distinguish from each other. There are currently no simple automated solutions available for color deficient individuals to decipher color content in a document that they may already possess.

Some existing solutions that deal with the correction of an image prior to producing an output are available, but these solutions operate on an assumption that a user configuring a device to produce an output of an image knows what types of correction need to be applied to the image. Some of these solutions perform the correction by requiring the user to select a correction factor for individual color planes while others require the user to select the type and degree of color blindness.

Accordingly, there is a need for an automatic color deficient vision correction solution that helps an end user in correcting an image before producing an output even if the user may have little or no knowledge of what correction should be applied. There is a need for a solution that creates a corrected image based on at least one type of color deficiency with little to no input from the user.

SUMMARY

According to one example embodiment of the present disclosure, there is provided a method that includes receiving an image, automatically determining at least one region of interest in the image based on at least one color deficiency type from a plurality of color deficiency types, modifying the image by correcting the at least one region of interest and producing an output of the modified image.

In one aspect of one example embodiment, if the determined at least one region of interest reaches a predetermined size, at least one more region of interest in an area bordering the determined at least one region of interest may be determined. In another aspect, determining the at least one region of interest may include searching for a color in the image having a specified color space value in the image. In yet another aspect, determining at least one region of interest may include assigning a common color space value to at least two colors in the image that appear similar based on the at least one color deficiency type.

In another aspect of one example embodiment, determining the at least one region of interest may include checking a percentage of the determined at least one region of interest for each color deficiency type of the plurality of color deficiency types relative to a total size of the image and then correcting the determined at least one region of interest for the color deficiency type with a highest percentage.

In another aspect of one example embodiment, correcting the at least one region of interest may include remapping a color in the at least one region of interest to another color that is distinguishable from other colors in the at least one region of interest. In another aspect of the first example embodiment, correcting the at least one region of interest may include embedding a spatial texture in the determined at least one region of interest. In yet another aspect of the first example embodiment, the correcting the at least one region of interest may be performed when the at least one region of interest reaches a predetermined size.

According to a second example embodiment, a region of concern in an image may be received. In one aspect of the second example embodiment, the region of concern may be checked for a region of interest based on at least one type of color deficiency. In another aspect of the second example embodiment, the region of concern may be corrected when at least two regions of concern have been determined.

Other embodiments, objects, features and advantages of the disclosure will become apparent to those skilled in the art from the detailed description, the accompanying drawings and the appended claims.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

The following description and drawings illustrate embodiments sufficiently to enable those skilled in the art to practice the present disclosure. It is to be understood that the disclosure is not limited to the details of construction and the arrangement of components set forth in the following description or illustrated in the drawings. The disclosure is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense, and the scope of the present disclosure is defined by the appended claims.

It is also to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Unless limited otherwise, the terms "connected," "coupled," "mounted" and variations thereof herein are used broadly and encompass direct and indirect connections, couplings, and mountings. In addition, the terms "connected" and "coupled" and variations thereof are not restricted to physical or mechanical connections or couplings. Further, the terms "a" and "an" herein do not denote a limitation of quantity, but rather denote the presence of at least one of the referenced item.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block of the diagrams or combinations of blocks in the diagrams discussed in detail in the descriptions below.

These computer program instructions may also be stored in a non-transitory computer-readable medium that may direct a computer or other programmable data processing apparatus to function in a particular manner, such that the instructions stored in the computer-readable medium may produce an article of manufacture including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps or actions for performing the specified functions and program instruction means for performing the specified functions. It will also be understood that each block of the diagrams, and combinations of blocks in the diagrams, may be implemented by special purpose hardware-based computer systems that perform the specified functions or steps or by combinations of special purpose hardware and computer instructions.

Disclosed are a system and methods of automatic application of color deficient correction to an image. The methods of automatic application of color deficient correction may be activated by a user of a client device or an imaging device. The methods, once activated, may then proceed with a detection and correction process of an input image, thereby modifying any regions of concern it may detect in the image. The regions of concern may be modified regardless of the color plane of the image. The methods may be performed without regard to which type of color deficiency the user may have. The methods for automatic detection of regions of concern and correction thereof may be influenced by any global or personal print settings for color deficiency on the device.

For purposes of the present disclosure, it will be appreciated that the term image as will be described below may refer to documents, photos or any other file that may be used to generate or produce a printed output on a media or a visual output on a display, such as, for example, a computer monitor that may be part of a client device. The process for printing the one or more images may require that the one or more of these images be processed and/or reassembled into a format that resembles that which is displayed on an interface when the one or more images are accessed. If the one or more images displayed on or retrieved by the imaging device are not in a format that the imaging device recognizes or is capable of printing, a transform or conversion process may be performed on the one or more images in order to convert the one or more images into a format recognizable by the imaging device, i.e., a printable format. Printable formats may include, but are not limited to, PCL, PostScript, .jpeg and PDF formats.

Figure 1:
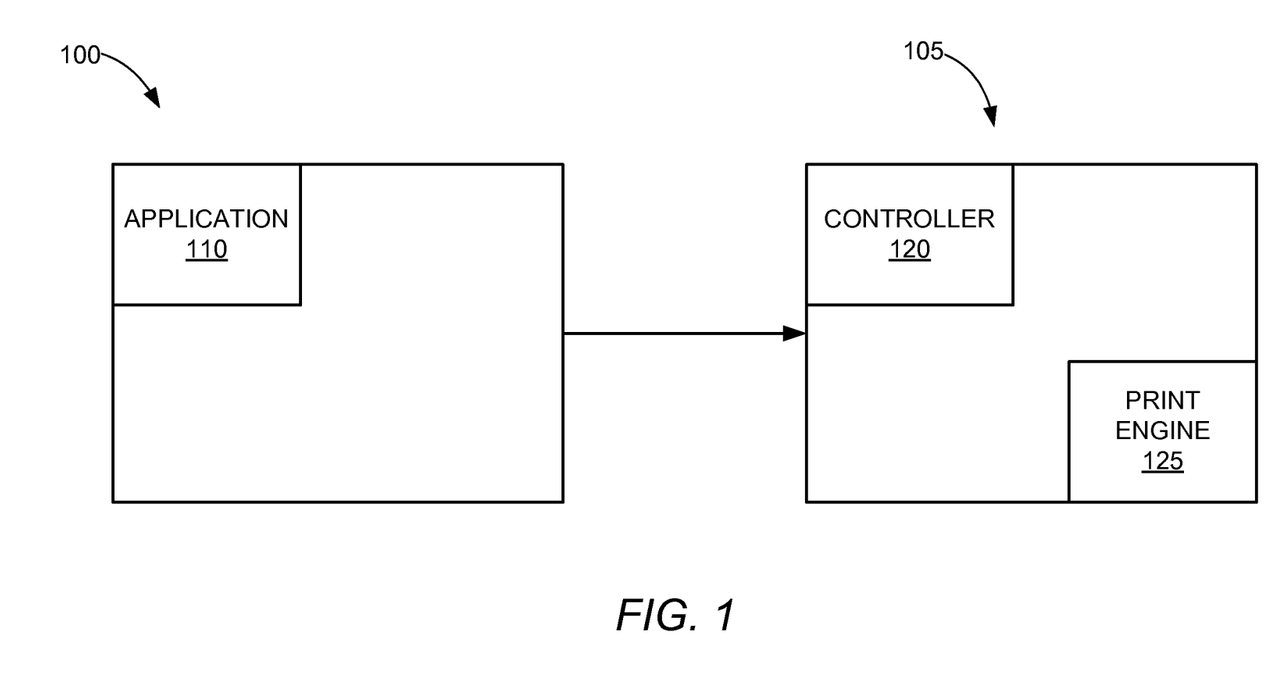
FIG. 1 is a block diagram of a document processing system.

Referring to FIG. 1, there is shown a block diagram of a document processing system including a client device 100 that may be communicatively connected to an imaging device 105, according to one example embodiment. Client device 100 may include an application 110 that may produce an image to be printed on imaging device 105. Imaging device 105 may include a controller 120 and a print engine 125.

Client device 100 may be a personal computer, as shown in FIG. 1. Client device 100 may include a processor (not shown) and a computer-readable medium (not shown), such as a random access memory (RAM), coupled to the processor. The processor may execute computer-executable program instructions stored in the memory. Computer executable program instructions stored in the memory may include an imaging device driver (not shown). The imaging device driver may implement a set of instructions adapted to process an image to improve contrast difference between at least two colors in the image.

In other alternative example embodiments, client device 100 may be any other device capable of sending documents or images to imaging device 105 such as, for example, USB flash drives, smart phones, cameras and memory cards.

Client device 100 may be communicatively connected to imaging device 105, as shown in FIG. 1. Client device 100 may be connected to imaging device 105 via a communication link, which may be established by a wired or wireless connection such as, for example, an Ethernet connection. Client device 100 may be a computer or processor-based device capable of communicating with a communications network via a signal, such as a wireless frequency signal or a direct wired communication signal. A respective communication interface associated with client device 100 may facilitate communications between client device 100 and imaging device 105.

Imaging device 105 may be any device capable of printing or producing a hard copy data file or document stored in electronic form, such as a laser, inkjet or dot matrix printer or multi-function printing device that has the capability of performing other functions, such a faxing, e-mailing, scanning and/or copying, in addition to printing. In some alternative example embodiments, imaging device 105 may be a standalone scanning device that may receive an image to be scanned from a user of imaging device 105.

The user of imaging device 105 may utilize a user-interface (UI) (not shown) of imaging device 105 to view the image. The UI may include the display which may be, for example, a monitor for viewing the image, and an input device (not shown), such as a keyboard or a pointing device (e.g., a mouse, trackball, pen, touch pad, or other device), for interacting with imaging device 105. In some example embodiments, the UI may have an integrated display and input device, such as a touch screen display.

The user of imaging device 105 may utilize imaging device 105 to process a document having an image in a typical scan/copy/fax function. A correction solution in imaging device 105 may be accessed and activated through the input device to indicate that a color deficient vision correction of the document may be performed on the document. As will be described in greater detail below, the correction solution may include a list of color deficiency types and/or color hues which may be used in the detection and correction process. The list of color deficiency types and/or color hues may be stored in the memory of imaging device 105.

In some alternative example embodiments, the correction solution may be located in or accessible by client device 100 and applied prior to sending the image to imaging device 105 for outputting.

Figure 2:
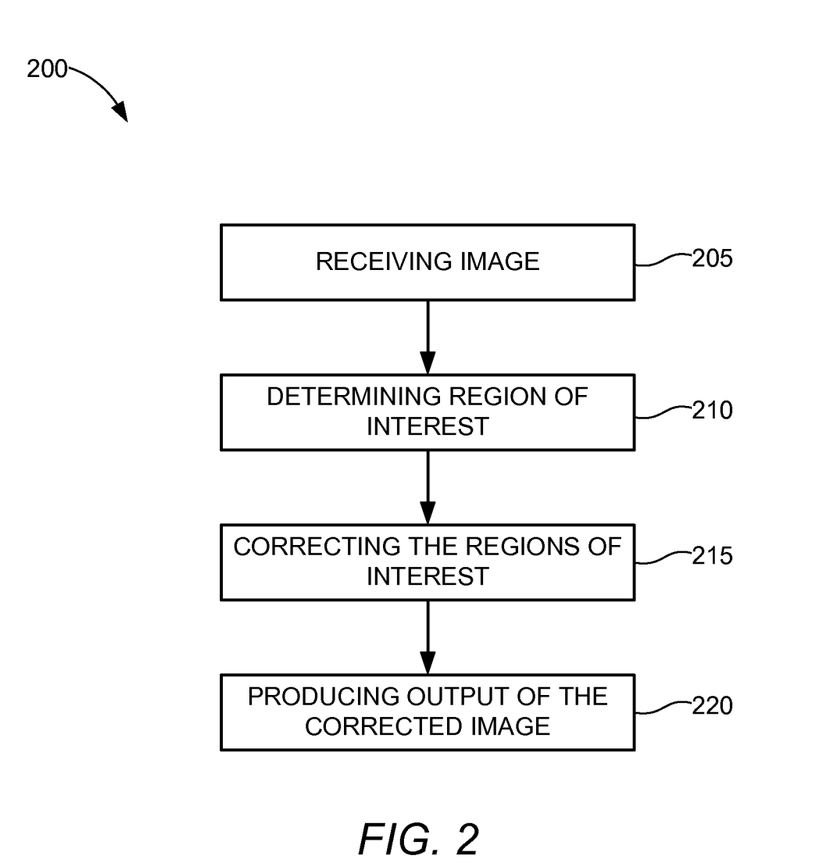
FIG. 2 is one example flowchart of a method of improving color differentiation.

Referring to FIG. 2, there is shown one example flowchart of a method 200 of automatic color deficient vision correction of an image. Method 200 may process an image prior to printing at imaging device 105 or prior to producing an electronic output of the image. Method 200 may detect regions of concern based on color deficiency type and modify the regions of concern to make the colors in the image distinguishable to someone with color vision deficiency.

At block 205, imaging device 105 may receive an image having colors. The image may be received by the controller in imaging device 105 from client device 100. Receiving the image may be performed via the communications link set forth above, or by means of a communications interface that will be apparent to those skilled in the art. In one alternative example embodiment, the image may be received through a function in imaging device 105 such as, for example, scanning, copying or faxing.

At block 210, the content of the received image may be analyzed to determine at least one region of interest in the image. The region of interest may be determined based on one or more types of color vision deficiency. For example, an image received through a scanning function performed in imaging device 105 may be analyzed and may be determined to show a region having a red portion of the color spectrum which may be considered a first region of concern for an individual having a type of color vision deficiency such as, for example, protanopia, protanomaly, deuteranopia, or deuteranomaly.

In one alternative embodiment, when the problematic area or the region of concern reaches a predetermined size, areas of the image bordering the region of concern may be checked for another region of concern. For example, when the first region of concern in the image is determined, other regions which may or may not border the first region of concern may be searched in the image. The other regions of concern may be determined based on the color in the first region of concern which may be perceived in a similar manner by an individual having one or more types of color vision deficiency. The other regions of concern may then be tagged, along with the first region of concern, as one or more regions of interest in the image.

The same process of detecting regions of interest in the image may be applied to regions in the image having another color such as, for example, a blue-yellow color hue, which may be considered as regions of concern for individuals with tritanopia or tritanomaly. Other color hues and other types of color vision deficiency which may be used to determine one or more regions of interest will be apparent to those skilled in the art.

One method for detecting regions of interest in the image may use an algorithm searches for colors predefined or tagged as problematic colors, based on LMS color space values, or any other color space, of the problematic colors. Colors may be tagged as problematic for a given type of color vision deficiency if the given type of color vision deficiency would make the problematic colors appear similar to each other. Surface plots may then be created to assign a common value to the problematic colors for a given type of color vision deficiency. For example, when a given color deficiency causes two colors with different LMS values to appear similar to an individual having this color vision deficiency, these two colors and any other similarly-hued color may comprise a common surface when plotted in a 3D space. A separate surface may then be plotted for each group of colors that may appear similar to each other for a given type of color vision deficiency, thereby creating a group of surfaces for each color vision deficiency analyzed.

Once the image is captured and analyzed for regions of interest, specific attention may be given to the detected regions of interest. Algorithms may be used to search for regions of color that match one of the surface plots created for a given type of color vision deficiency. When a region containing a problematic color is detected, the size of the region is checked against a set threshold or against a predetermined region size. The predetermined size may be set in the controller of imaging device 105 during manufacturing or may be configurable by a user or administrator of imaging device 105. For example, the predetermined size may be set as a region having a size of, for example, at least 40 pixels. When the algorithm determines a region having a problematic color and determines that the region has a size of 96 pixels, the region may be designated a region of interest and subjected to correction in order to improve color differentiation in the region of interest.

In one aspect, at least two regions of interest containing colors on the same reference surface may be detected before correction is required. In another aspect, the number of regions of interest that contains problematic colors for a given type of color vision deficiency may be set by the user or administrator as a requirement before a correction may be performed on the regions of interest.

When at least one region of interest is detected, the region(s) of interest may be corrected to improve color differentiation for individuals with a given type of color vision deficiency (block 215). In some example embodiments, the method for correcting the regions of interest may include color remapping the problematic colors to a color that is distinguishable to individuals that may have a certain type of color vision deficiency. In some other example embodiments, color correction may include embedding at least one spatial texture in the regions of interest, which may or may not change the color hues in the image. In yet other example embodiments, color gamut compression may be performed on the regions of interest to improve color differentiation.

It will be apparent to those skilled in the art that other color correction methods may be applied to the regions of interest. Such other methods include, but are not limited to, color shifting or performing small shifts of the colors in the regions of interest along a color spectrum, and intensity shifting which may shift a value and/or saturation of the colors in the image. In some example embodiments, correcting the regions of interest may also consider surrounding areas of the determined regions of interest when performing the correction method such that the corrected region may still be distinguishable from the rest of the image.

At block 220, an output of the modified image wherein the one or more regions of interest have been corrected may be produced. The output may refer to print data corresponding to the modified image that is sent to the print engine of imaging device 105 or visual data that is presented on a display associated with client device 100 or imaging device 105 for viewing by the user.

In some example embodiments, there may be an option of presenting the modified image with the corrected regions of interest in the form of a preview prior to producing the output. The user of imaging device 105 may review the corrected image output on the display of imaging device 105 and examine any region that may be of interest in greater detail by means of a user interface provided in image device such as, for example, through the use of the zoom and/or pan features. Method 200 may wait for user confirmation prior to producing an output of the corrected image. If the user may be dissatisfied with the corrected image, the user may increase the degree of correction. In some other example embodiments, the user may also select a region of interest and have the selected region of interest reprocessed such that the correction process of method 200 may be repeated over the selected region of interest or a defined area of the image on the display of imaging device 105 with an increased degree of correction as may be defined by the user. In yet other example embodiments, the reprocessing of the selected region of interest may be performed without an increased degree of correction.

Figure 3:
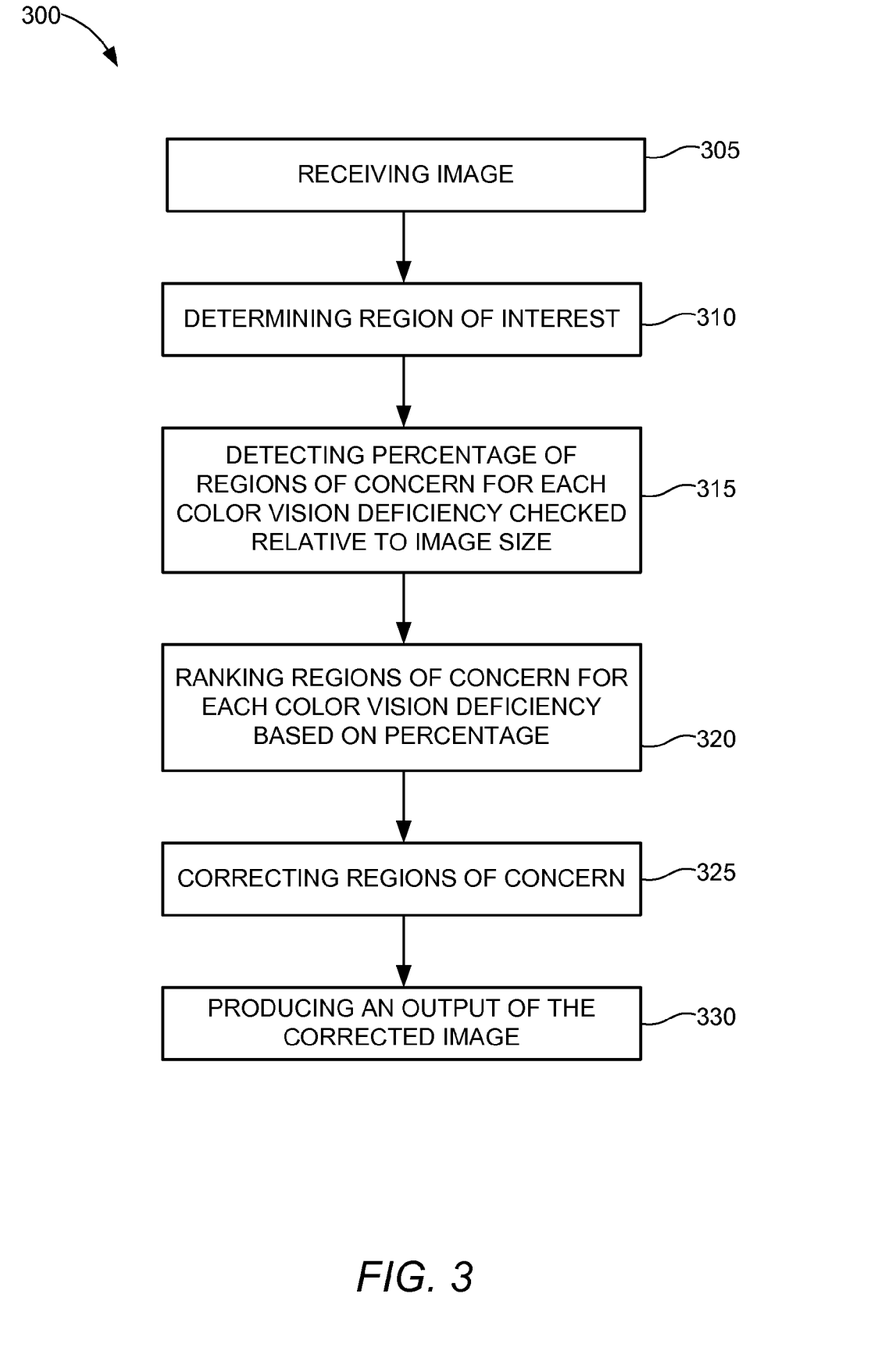
FIG. 3 is one example flowchart of an alternative method of improving color differentiation.

Referring to FIG. 3, there is shown a second example flowchart of a method 300 of automatic color deficient vision correction of an image. Method 300 may process an image prior to sending the image to imaging device 105, prior to printing the image at imaging device 105 or prior to producing an electronic output of the image. Method 300 may detect regions of concern based on color deficiency type, rank the regions of concern determined from a highest offender to a lowest offender based on color vision deficiency type, and correct the regions of concern to make the colors in the image distinguishable to someone with color vision deficiency.

At block 305, imaging device 105 may receive an image having colors. The image may be received by the controller in imaging device 105 from client device 100. Receiving the image may be performed via the communications link set forth above, or by means of a communications interface that will be apparent to those skilled in the art. In some alternative example embodiments, the image may be received through a function in imaging device 105 such as, for example, scanning, copying and faxing.

At block 310, the content of the received image may be analyzed to determine at least one region of interest in the image. The region of interest may be determined based on one or more types of color vision deficiency. For example, an image received through a scanning function performed in imaging device 105 may be analyzed to locate a region having a certain portion of the color spectrum, such as a red portion, which may be considered a first region of concern for an individual having protanopia, protanomaly, deuteranopia, or deuteranomaly. The same process of detecting regions of interest in the image may be applied for regions in the image having a blue-yellow color hue, which may be considered regions of concern for individuals with tritanopia or tritanomaly.

In one alternative embodiment, the received image may be checked for regions of concern for every predetermined color vision deficiency type. For example, after checking for at least one region of interest in the received image based on a first color deficiency type (e.g. protanopia), the image may be checked for another region of interest based on a second color deficiency type (e.g. tritanopia). This process may be repeated for all of the types of color vision deficiency set in imaging device 105. Other color hues and other types of color vision deficiency which may be used to determine one or more regions of interest will be apparent to one skilled in the art.

At block 315, a percentage of the size of the regions of interest relative to the total image size of the received image may be determined for each type of color vision deficiency. For example, when block 310 returns a first region of interest for the first color vision deficiency type having 100 pixels, the percentage of the first region of interest may be determined based on the total image size of the received image. If the total image size of the received image is, for example, 500 pixels, the first region of interest for the first color vision deficiency may be said to comprise 20% of the received image. The same process may be performed to calculate the percentage of the regions of interest for all other color vision deficiency types identified at block 310.

The calculated percentage values may be considered as the level of offense per color vision deficiency type, wherein the higher the calculated percentage value is for a particular color vision deficiency type, the higher its offense is. The calculated percentage values may then be used to weigh the application of correction for each color vision deficiency type, starting from the highest offender to the lowest.

At block 320, the types of color vision deficiency may then be ranked from the highest offender to the lowest offender based on the percentage values of their respective regions of interest. For example, if five color vision deficiency types are determined to have percentage values of 20%, 30%, 40%, 50% and 60%, respectively, the types may be ranked from the highest offender starting from the fifth type, to the lowest offender, which is the first type.

At block 325, correcting the regions of interest may then proceed from highest offender to the lowest offender. For example, since the fifth type is determined to have the highest percentage of regions of interest relative to the total image size, correction of the determined regions of interest based on the fifth type of color vision deficiency may be performed first. Correction of the regions of interest may then be performed to the second highest offender, third highest offender and so forth, until the determined regions of interest of every color vision deficiency type have been corrected.

In some example embodiments, a threshold based on image quality may be set to determine end conditions for corrections of the regions of interest in the image. For example, a threshold of 30% of the image may be set, and the correction process of the regions of concern may progress from highest to lowest percentage values until 30% of the image has been corrected or altered. The threshold may be preset in imaging device 105 or may be configurable by an administrator or user of imaging device 105.

In some example embodiments, the method for correcting the regions of interest may include color remapping the problematic colors to a color that is distinguishable to individuals that may have a given type of color vision deficiency. In some other example embodiments, color correction may include embedding at least one spatial texture in the regions of interest, which may or may not change the color hues in the image. In yet other example embodiments, color correction to improve color differentiation in the regions of interest may include the performance of color gamut compression.

It will be apparent to those skilled in the art that other color correction methods may be applied to the regions of interest. Such methods may include, but are not limited to, color shifting or performing small shifts of the colors in the regions of interest along a color spectrum and intensity shifting, which may shift a value and/or saturation of the colors in the image. Correcting the regions of interest may also consider surrounding areas of the determined regions of interest when performing the correction method, such that the corrected region may still be distinguishable from the rest of the image.

Upon completion of the color corrections, an output of the modified image wherein the one or more regions of interest have been corrected may be produced (block 330). The output may refer to a print data corresponding to the modified image that is sent to the print engine of imaging device 105 or a visual data that is presented on a display in client device 100 or imaging device 105 for viewing by the user.

Figure 4:
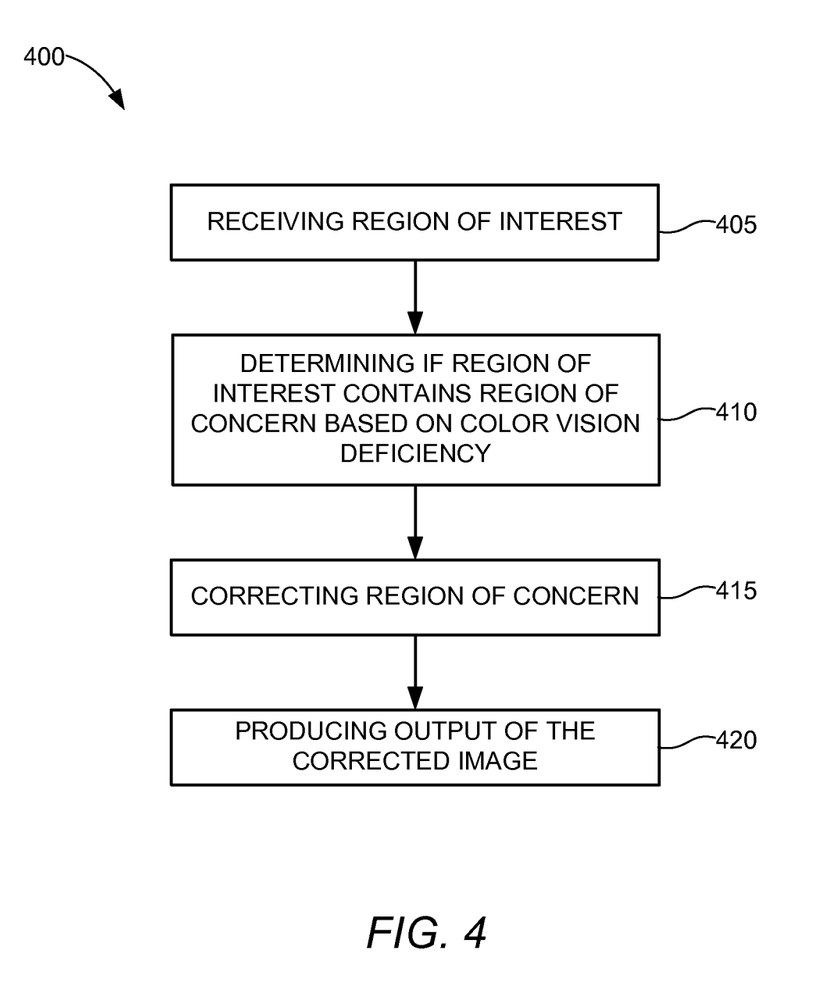
FIG. 4 is one example flowchart of another alternative method of improving color differentiation.

Referring to FIG. 4, there is shown one example flowchart of a method 400 of improving color differentiation. Method 400 may process an image prior to printing at imaging device 105 or prior to producing an electronic output of the image. Method 400 may receive a region of concern selected by the user of imaging device 105, detect regions of interest in the region of concern based on color deficiency type, and correct the regions of concern to make the colors in the image distinguishable to someone with color vision deficiency.

At block 405, imaging device 105 may receive a region of interest having colors. The region of interest may be part of an image that has been received by the controller in imaging device 105 from client device 100. Receiving the region of interest may be performed via the communications link set forth above, or by means of a communications interface that will be apparent to those skilled in the art. In some alternative example embodiments, the image may be received through a function in imaging device 105 such as, for example, scanning, copying or faxing.

At block 410, the region of interest may be analyzed to determine if the received region of interest contains a region of concern based on at least one color deficiency type. For example, the region of interest received may be analyzed for at least one region of concern having a certain portion of the color spectrum, such as a red portion, which may be considered a first region of concern for an individual having a type of color deficiency such as, for example, protanopia, protanomaly, deuteranopia, or deuteranomaly.

In one alternative example embodiment, when the problematic area or the region of concern reaches a predetermined size, areas of the image bordering the region of concern may be checked for another region of concern. For example, when a first region of concern in the image is determined, other regions which may or may not border the first region of concern may be searched in the image. The other regions of concern may be determined based on the color in the first region of concern which may be perceived in a similar manner by an individual with one or more types of color vision deficiency.

The same process of detecting regions of concern in the received region of interest may be applied to regions in the image having other color hues, such as a blue-yellow color hue, for example, which may be considered regions of concern to individuals with a type of color vision deficiency such as, for example, tritanopia or tritanomaly. Other color hues and other types of color vision deficiency which may be used to determine one or more regions of concern will be apparent to those skilled in the art.

One method for detecting regions of concern in the received region of interest may use an algorithm that searches for colors predefined or tagged as problematic colors, based on LMS color space values, or any other color space, of the problematic colors. Colors may be tagged as problematic for a given type of color vision deficiency if the type of color vision deficiency would make the problematic colors appear similar to each other. Surface plots may then be created to assign a common value to the problematic colors for a given type of color vision deficiency. For example, when a given color deficiency causes two colors with different LMS values to appear similar to an individual having this color vision deficiency, these two colors and any other similarly-hued color may comprise a common surface when plotted in a 3D space. A separate surface may then be plotted for each group of colors that may appear similar to each other for a given type of color vision deficiency, thereby creating a group of surfaces for each color vision deficiency analyzed.

Once the region of interest is analyzed for regions of concern, specific attention may be given to the detected regions of concern of a predetermined size. Algorithms may be used to search for areas having a color that matches one of the surface plots created for a given type of color vision deficiency. When a region containing a problematic color is detected, the size of the region is checked against a set threshold or against a predetermined size. The predetermined size may be set in the controller of imaging device 105 during manufacturing or may be configurable by an administrator or user of imaging device 105. For example, the predetermined size may be set as a region having a size of, for example, at least 40 pixels. When the algorithm determines a region having a problematic color and determines that the region has a size of 96 pixels, the region may be designated a region of concern and may be subjected to correction in order to improve color differentiation in the region of interest.

In some example embodiments, at least two regions of concern containing colors on the same reference surface may be detected before correction is required. In yet another alternative embodiment, the number of regions of interest that contains problematic colors for a given type of color vision deficiency may be set by an administrator or user as a requirement before a correction may be performed on the regions of interest.

When at least one region of concern in the region of interest is detected, the regions of concern may then be corrected to improve color differentiation for individuals with a given type of color vision deficiency (block 415). In some example embodiments, a method for correcting the regions of concern may include color remapping the problematic colors to colors that are distinguishable by individuals with a given type of color vision deficiency. In other example embodiments, color correction may include embedding at least one spatial texture in the regions of concern, which may or may not change the color hues in the image. In yet other embodiments of correcting the regions of concern to improve color differentiation, color gamut compression may be performed.

It will be apparent to one skilled in the art that other color correction methods may be applied to the regions of concern. Such color correction methods may include, but are not limited to, color shifting or performing small shifts of the colors in the regions of concern along a color spectrum and intensity shifting, which may shift a value and/or saturation of the colors in the image. In some example embodiments, correcting the regions of concern may also include considering areas surrounding the determined regions of concern, such that the corrected region may still be distinguishable from the rest of the image.

At block 420, an output of the modified image wherein the one or more regions of concern have been corrected may be produced. The output may refer to print data corresponding to the modified image that is sent to the print engine of imaging device 105 or visual data that is presented on a display associated with or incorporated into client device 100 or imaging device 105 for viewing by the user.

It will be appreciated that although the examples described and shown above use two colors to create another perceived color, other colors in any number and combination may be used to produce the colors printed on a substrate or displayed on an output device. It will be appreciated that while there may be a single pel or two of a color that may be used, the logic of the aforementioned example embodiments includes the understanding of all possible color combinations and includes applying various formulas to manipulate the pels of an image or colored document that allows improved legibility and contrast difference in color documents for individuals with color deficiency.

It will be appreciated that the actions described and shown in the example flowcharts may be carried out or performed in any suitable order. It will also be appreciated that not all of the actions described in FIGS. 2, 3 and 4 need to be performed in accordance with the embodiments of the disclosure and/or additional actions may be performed in accordance with other embodiments of the disclosure.

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
   receiving an image;
   automatically determining at least one region of interest in the image based on at least one color deficiency type from a plurality of color deficiency types;
   modifying the image by correcting the at least one region of interest; and
   producing an output of the modified image,
   wherein the correcting the at least one region of interest is performed when the at least one region of interest reaches a predetermined size and wherein at least one of the receiving, the automatically determining, the modifying and the producing is performed by a processor.

2. The method of claim 1, wherein the determining the at least one region of interest includes searching for a color in the image having a specified color space value in the image.

3. The method of claim 2, further comprising assigning a common color space value to at least two colors in the image that appear similar based on the at least one color deficiency type.

4. A method, comprising:
   receiving an image;
   automatically determining at least one region of interest in the image based on at least one color deficiency type from a plurality of color deficiency types;
   modifying the image by correcting the at least one region of interest; and
   producing an output of the modified image,
   wherein the determining the at least one region of interest includes checking a percentage of the determined at least one region of interest for each color deficiency type of the plurality of color deficiency types relative to a total size of the image and wherein at least one of the receiving, the automatically determining, the modifying and the producing is performed by a processor.

5. The method of claim 4, wherein the correcting corrects the determined at least one region of interest for the color deficiency type with a highest percentage.

6. The method of claim 1, wherein the correcting the determined at least one region of interest ends after a threshold percentage of the image has been modified.

7. The method of claim 1, wherein the correcting the at least one region of interest includes remapping a color in the at least one region of interest to another color that is distinguishable from other colors in the at least one region of interest.

8. The method of claim 1, wherein the correcting the at least one region of interest includes embedding a spatial texture in the determined at least of region of interest.

9. The method of claim 1 further comprising, receiving at least one region of concern in the image.

10. The method of claim 9 further comprising, checking the at least one region of concern for the at least one region of interest based on at least one type of color deficiency.

11. The method of claim 10 further comprising, correcting the region of concern when the region of concern contains at least two regions of interest have been determined.

12. An imaging device with a non-transitory computer-readable storage medium containing computer executable instructions to:
   receive an image;
   determine at least one region of interest in the image based on at least one color deficiency type;
   modify the image by correcting the at least one region of interest; and
   produce an output of the corrected image,
   wherein the correcting the at least one region of interest is performed when the at least one region of interest reaches a predetermined size.

13. The imaging device of claim 12, wherein the determining the at least one region of interest includes searching for a color in the image having a specified color space value in the image.

14. The imaging device of claim 12, wherein the correcting the at least one region of interest is performed when at least two regions of interest have been determined.

15. The imaging device of claim 12, wherein the at least one color deficiency type is selected from a plurality of color deficiency types stored in the non-transitory computer-readable storage medium of the imaging device.

16. A computer program product embodied on a non-transitory computer readable storage medium, the computer program product comprising a program module having instructions for:
   receiving an image;
   automatically determining at least one region of interest in the image based on at least one color deficiency type from a plurality of color deficiency types;
   modifying the image by correcting the at least one region of interest; and
   producing an output of the modified image,
   wherein if the determined at least one region of interest reaches a predetermined size, detecting at least one more region of interest in an area bordering the determined at least one region of interest.

17. The computer program product of claim 16, wherein the determining the at least one region of interest includes searching for a color in the image having a specified color space value in the image.

18. A method, comprising:
- receiving an image;
- automatically determining at least one region of interest in the image based on at least one color deficiency type from a plurality of color deficiency types;
- detecting at least one more region of interest in an area bordering the determined at least one region of interest if the determined at least one region of interest reaches a predetermined size;
- modifying the image by correcting the at least one region of interest; and
- producing an output of the modified image, wherein at least one of the receiving, the automatically determining, the modifying and the producing is performed by a processor.

* * * * *